United States Patent [19]

Mori et al.

[11] Patent Number: 4,982,926
[45] Date of Patent: Jan. 8, 1991

[54] RETRACTABLE MIRROR APPARATUS

[75] Inventors: Keiji Mori, Kariya; Hidekazu Kogita, Toyota, both of Japan

[73] Assignee: Aisin Seiki Kabushiki Kaisha, Kariya, Japan

[21] Appl. No.: 406,256

[22] Filed: Sep. 12, 1989

[30] Foreign Application Priority Data

Sep. 30, 1988 [JP] Japan .......................... 63-128893[U]

[51] Int. Cl.$^5$ ............................................. G02B 7/18
[52] U.S. Cl. .............................. 248/479; 74/421 A; 192/106.1; 192/30 V; 350/604; 350/637
[58] Field of Search ............... 248/479, 486, 487, 476; 74/421 A, 502.1; 192/106.1, 30 V, 108; 350/604, 605, 637, 632

[56] References Cited

U.S. PATENT DOCUMENTS

| 4,403,829 | 9/1983 | Thujiuchi et al. | 350/637 |
|---|---|---|---|
| 4,477,150 | 10/1984 | Usami et al. | 350/637 |
| 4,626,083 | 12/1986 | Nakayama et al. | 350/604 |
| 4,626,084 | 12/1986 | Kumai | 350/604 |
| 4,657,362 | 4/1987 | Suzuki | 248/479 X |
| 4,692,000 | 9/1987 | Wada et al. | 350/637 |
| 4,786,156 | 11/1988 | Kotani et al. | 248/479 X |
| 4,786,157 | 11/1988 | Mori et al. | 350/604 X |
| 4,832,477 | 5/1989 | Torii et al. | 350/604 X |
| 4,893,916 | 1/1990 | Sakuma et al. | 350/637 |
| 4,919,526 | 4/1990 | Umekawa et al. | 350/637 X |

FOREIGN PATENT DOCUMENTS 61-12452 1/1986 Japan .

Primary Examiner—David M. Purol
Attorney, Agent, or Firm—Oblon, Spivak, McClelland, Maier & Neustadt

[57] ABSTRACT

A retractable mirror apparatus according to this invention comrises: a base; a retraction shaft held on the base; a mirror frame having a mirror mounting portion and engaged with the retraction shaft rotatably by a predetermined angle; a gear held rotatably on the retraction shaft and having engaged concave portions or engaged convex portions on the end surface thereof; a motor for rotating the mirror frame disposed in the mirror frame; a claw clutch fixed on the retraction shaft and having engaging convex portions or engaging concave portions engageable and disengageable with the engaged concave portions or the engaged convex portions of the gear in the area thereof facing the engaged concave portions or the engaged convex portions of the gear, wherein the gear or the claw clutch further comprises cushioning member disposed in a manner elastically contacting with the other one of the gear and the claw clutch or in a manner elastically contactable with the other one of the gear and the claw clutch. The retractable mirror apparatus can suppress the generation of the unpleasant clicking noises, which sound like hitting a metal against the other metal, during the manual operation.

12 Claims, 4 Drawing Sheets

RETRACTABLE MIRROR APPARATUS

BACKGROUND OF THE INVENTION

1. Field of the Invention

This invention relates to a retractable mirror apparatus, and can be applied to a door mirror of automobiles.

2. Description of the Prior Art

Many automobiles have been provided with retractable mirror apparatuses. In these retractable mirror apparatuses, a retraction shaft is fixed on a mirror stay installed on a door, and a mirror frame provided with a mirror and a built-in motor is fixed on and held rotatably around the retraction shaft. When storing the mirror, the motor is turned on in order to rotate the mirror frame around the retraction shaft by a predetermined angle, thereby automatically retracting the mirror frame.

In one of the retractable mirror apparatuses, a gear and a claw clutch are held on a retraction shaft as disclosed in Japanese Unexamined Patent Publication (KOKAI) No. 12452/1986. Engaged convex portions are formed on the end surface of the gear, and engaging concave portions, which engage with the engaged convex portions, are formed on the claw clutch.

In most cases, the mirror frame provided with a mirror is automatically retracted by the motor in the above-mentioned retractable mirror apparatuses. However, in certain cases, the mirror frame is manually operated to rotate. In the latter cases, the engagement between the engaging concave portions of the claw clutch and the engaged convex portions of the gear moves while dragging. Accordingly, the engaging concave portions and the engaged convex portions are brought into contact with each other several times, thereby causing clicking noises. The noises are especially unpleasant in the case where the claw clutch and the gear are made of metallic materials, because the clicking noises result from metallic noises caused by the contact of the metallic gear with the metallic claw clutch, or vice versa.

SUMMARY OF THE INVENTION

This invention has been developed in view of the above-mentioned problem. It is therefore an object of this invention to provide a retractable mirror apparatus, in which the problem of the unpleasant noises resulting from the engagement between a claw clutch and a gear has been improved.

A retractable mirror apparatus according to this invention comprises: a base; a retraction shaft held on the base; a mirror frame having a mirror mounting portion and engaged with the retraction shaft rotatably by a predetermined angle; a gear held rotatably on the retraction shaft and having engaged concave portions or engaged convex portions on the end surface thereof; a motor for rotating the mirror frame disposed in the mirror frame; a claw clutch fixed on the retraction shaft and having engaging convex portions or engaging concave portions engageable and disengageable with the engaged concave portions or the engaged convex portions of the gear in the area thereof facing the engaged concave portions or the engaged convex portions of the gear, wherein the gear or the claw clutch further comprises cushioning member disposed in a manner elastically contacting with the other one of the gear and the claw clutch or in a manner elasticaly contactable with the other one of the gear and the claw clutch.

The base is a component member to be mounted on a structure of a vehicle, such as an automobile, a bus and a truck and the like, a ship, a house, a building and the like. The base may be a mirror stay to be fixed on a door or a front fender in the case of an automobile.

The mirror frame has a mirror mounting portion on which a mirror is mounted.

The engaged convex portions or the engaged concave portions are formed on the end surface of the gear.

The motor is for rotating the mirror frame. In most cases, a speed reducer mechanism is provided between the motor and the gear.

The engaging concave portions or the engaging convex portions are formed in the area of the claw clutch facing the engaged convex portions or the engaged concave portions of the gear. The engaging concave portions or the engaging convex portions are arranged in a manner engageable and disengageable with the engaged convex portions or the engaged concave portions of the gear. If such is the case, a torque limiter mechanism may be employed, which will be later described in the following preferred embodiment according to this invention.

In the retractable mirror apparatus according to this invention, the cushioning member is disposed in at least one of the gear and the claw clutch, and the cushioning member is disposed in a manner elastically contacting with the other one of the gear and the claw clutch or in a manner elasticaly contactable with the other one of the gear and the claw clutch. In the case where the cushioning member is employed, the cushioning member may be formed in both of the gear and the claw clutch, or the cushioning member may be formed in either one of the gear and the claw clutch. The cushioning member may be formed of rubber, resin, foamed material made of rubber or resin, or composite material made of rubber or resin and fibers or particles reinforcing therefor.

When the engaged convex portions or the engaged concave portions of the gear and the engaging concave portions or the engaging convex portions of the claw clutch engage with each other, the cushioning member disposed in at least one of the gear and the claw clutch comes into contact with the other one of the gear and the claw clutch. Whereby the generation of the unpleasant noises has been suppressed.

Thus, the problem of the unplesant noises, occurring at the time of the engagement between the claw clutch and the gear, has been improved by the retractable mirror apparatus according to this invention. This improvement has been effected by the cushioning member disposed at least in one of the gear and the claw clutch.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT OF THE INVENTION

Having generally described this invention, a further understanding can be obtained by reference to a certain specific preferred embodiment which is provided herein for purposes of illustration only and are not intended to be limiting unless otherwise specified.

A retractable mirror apparatus of a preferred embodiment according to this invention will be hereinafter described with reference to the drawings. The retractable mirror apparatus of this preferred embodiment is the one applied to an automobile door mirror apparatus.

Figure 1:
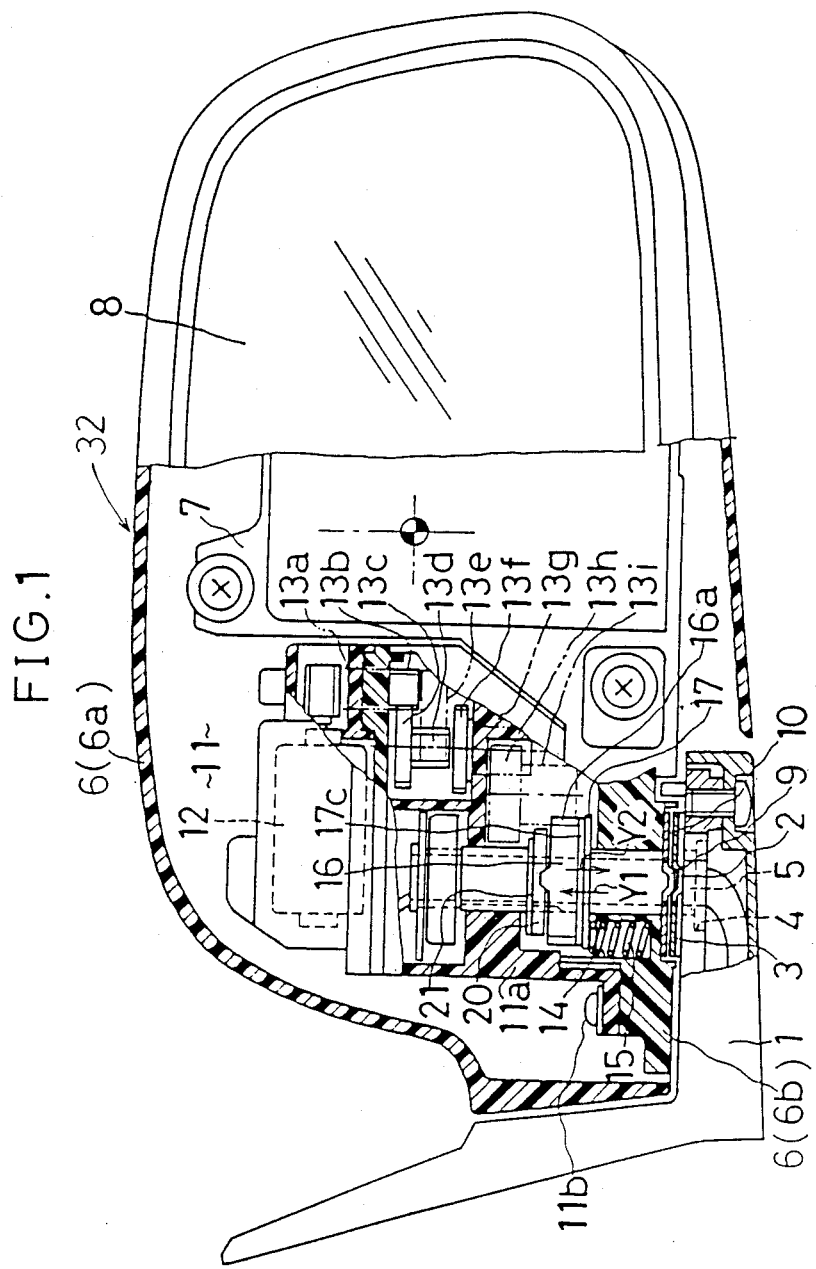
FIG. 1 is a side elevation view of a retractable of a preferred embodiment according to this invention, in which the major portion thereof is illustrated in section.

In this preferred embodiment, as illustrated in FIG. 1, a mirror stay 1 as the base is fixed at the front end of a vehicle door. A control cam plate 3 having a concave portion 2 is held on the mirror stay 1 in a manner locking the rotation thereof. A retraction shaft 5 is inserted into a hole 4 of the mirror stay 1, and fixed in an upright manner. A mirror frame 6, comprising a top portion 6a and a lower portion 6b, holds a mirror body 32. A mirror 8 is mounted on a mirror mounting portion 7 of the mirror frame 6 along with a mirror control actuator (not shown) interposing therebetween. A control cam plate 10 having a convex portion 9 is held on the lower surface of the lower portion 6b of the mirror frame 6 in a manner locking the rotation thereof. The concave portion 2 of the control cam plate 3 and the convex portion 9 of the control cam plate 10 are spaced at an angle of 120 deg. around the axis of the retraction shaft 5.

Figure 3:
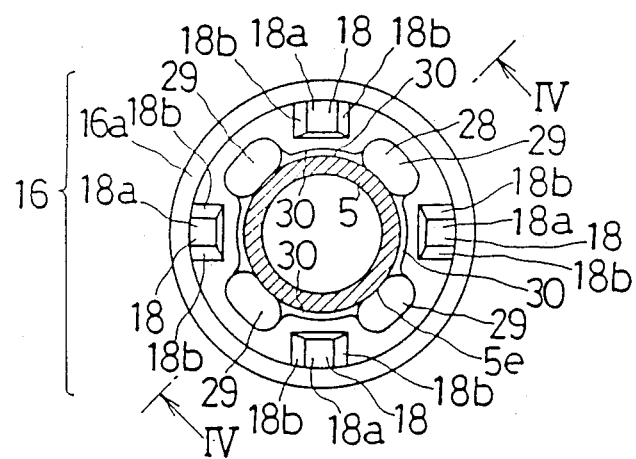
FIG. 3 is a view taken in the direction of the line III—III of FIG. 2.

A gear housing 11a is fixed with screws 11b on the lower portion 6b of the mirror frame 6 in the inner space 11 of the mirror body 32, a motor 12 is fixed on the gear housing 11a, and speed reducer gears 13a through 13i connected to the motor 12 are built-in in the gear housing 11a. A plurality of spring holes 14 are formed around the retraction shaft 5 in the lower portion 6b of the mirror frame 6, and coiled compression springs 15 are inserted into the spring holes 14. A gear 16 made of a rigid material such as metal is rotatably held by the retraction shaft 5. The gear 16 is placed on a resin plate 17c, and the resin plate 17c is placed on a washer plate 17 which is urged by the compression springs 15. As shown in FIG. 3, four (4) engaged convex portions 18 are formed on the end surface of the gear 16 in the circumferential direction of the gear 16, and disposed at predetermined spaces. The engaged convex portions 18 have a horizontal surface 18a and inclining surfaces 18b on both sides of the horizontal surface 18a. As shown in FIG. 1, the teeth 16a of the gear 16 mesh with the teeth of the speed reducer gear 13i.

Figure 2:
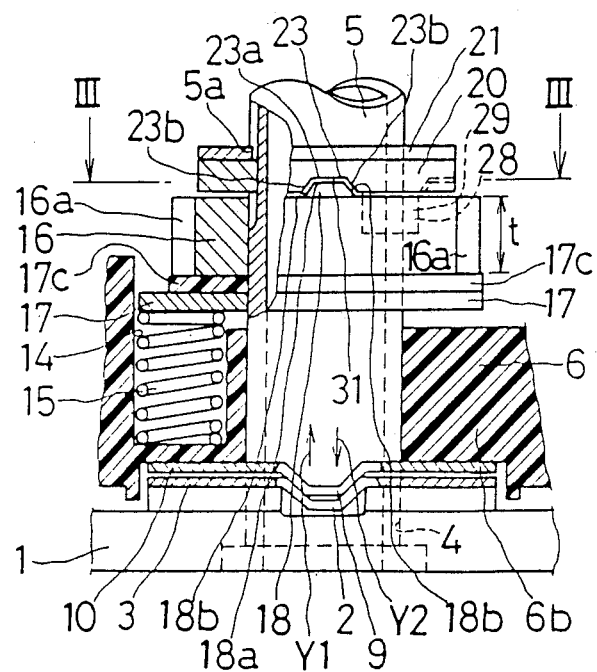
FIG. 2 is an enlarged cross-sectional view of the major portion of the retractable mirror apparatus of the preferred embodiment according to this invention.
Figure 6:
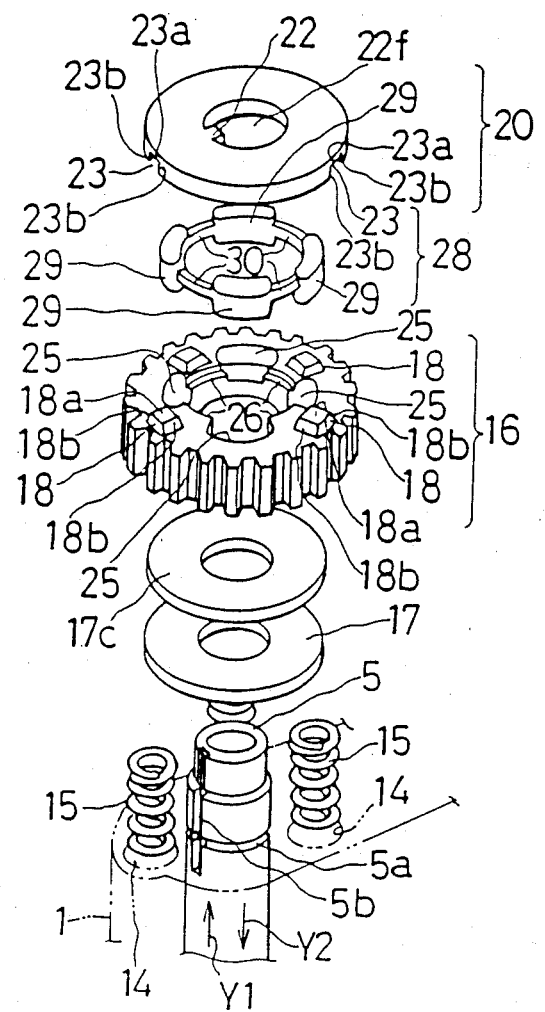
FIG. 6 is an exploded perspective view of the major portion of the retractable mirror apparatus of the preferred embodiment according to this invention.

In this preferred embodiment, a claw clutch 20 made of a rigid material such as metal is further fixed on the retraction shaft 5 at a position over the gear 16. In this arrangement, as shown in FIG. 2, a stop ring 21 is engaged with an annular groove 5a of the retraction shaft 5, thereby locking the coming-off of the claw clutch 20 in the axial direction of the retraction shaft 5. Further, as shown in FIG. 6, a convex portion 22 is formed on a shaft hole 22f of the claw clutch 20, and engaged with a concave portion 5b formed at the top end portion of the retraction shaft 5, thereby locking the rotation of the claw clutch 20 around the retraction shaft 5. Four (4) engaging concave portions 23 are formed on the end surface of the claw clutch 20 in the circumferential direction of the claw clutch 20, and disposed at predetermined spaces. The engaging concave portions 23 have a horizontal surface 23a and inclining surfaces 23b on both sides of the horizontal surface 23a.

In the arrangements of this preferred embodiment, the gear 16 is urged by the spring forces of the compression springs 15 in the direction specified by the arrow "Y1" in the Figures, namely in the direction toward the claw clutch 20. The engaged convex portions 18 of the gear 16 are accordingly urged to and engaged with the engaging concave portions 23 of the claw clutch 20. Consequently, a torque limiter mechanism is comprised of the claw clutch 20, the gear 16 and the compression springs 15. The engagement between the claw clutch 20 and the gear 16 is disengaged when a predetermined torque or more is applied.

In this preferred embodiment, when comparing the torque required for disengaging the engagement between the engaging concave portions 23 of the claw clutch 20 and the engaged convex portions 18 of the gear 16, namely the disengaging torque of the torque limiter mechanism, with the torque required for disengaging the engagement between the concave portion 2 of the control cam plate 3 and the convex portion 9 of the control cam plate 10, the former is set greater than the latter. As a result, the engagement between the concave portion 2 of the control cam plate 3 and the convex portion 9 of the control cam plate 10 is more likely to be disengaged than the engagement between the engaging concave portions 23 of the claw clutch 20 and the engaged convex portions 18 of the gear 16 is disengaged.

Figure 4:
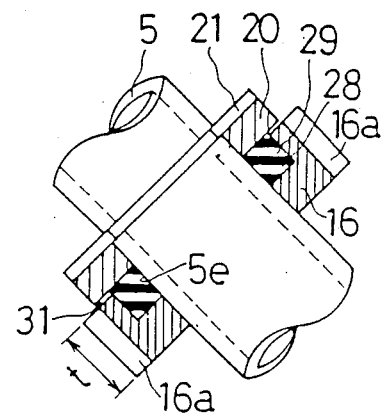
FIG. 4 is a view taken in the direction of the line IV—IV of FIG. 3.

Further, as shown in FIG. 6, four (4) housing concave portions 25, opening at the top surfaces, as well as four (4) grooves 26, opening at the top surfaces and the inner circumferential surfaces, are formed on the end surface of the gear 16 in this preferred embodiment. A cushioning member 28 is made of rubber, and comprises four (4) bulk portions 29 and four arm portions 30 connecting the neighboring bulk portions 29. The bulk portions 29 are housed in the housing concave portions 25 and the arm portions 30 are housed in the grooves 26, and thereby the cushioning member 28 is held in the gear 16. When the gear 16 engages with the claw clutch 20 as shown in FIG. 4, the top surfaces of the bulk portions 29 of the cushioning member 28 contact with the lower surface of the claw clutch 20 while exerting elastic forces, namely the top surfaces of bulk portions 29 of the cushioning member 28 elastically contact with the lower surface of the claw clutch 20. As a result, a clearance 31 is formed between the gear 16 and the claw clutch 20 as shown in FIGS. 2 and 4. The horizontal surfaces 23a of the engaging concave portions 23 and the horizontal surfaces 18a of the engaged convex portions 18 are accordingly kept in a non-contact state as shown in FIG. 2. Moreover, as shown in FIG. 3, the inner circumferential portions of the bulk portions 29 and the inner circumferential portions of the arm portions 30 contact closely with the outer surface 5e of the retraction shaft 5 while exerting elastic forces of themselves.

The operation and the usage of the retractable mirror apparatus of this preferred embodiment will be hereinafter described.

Figure 7:
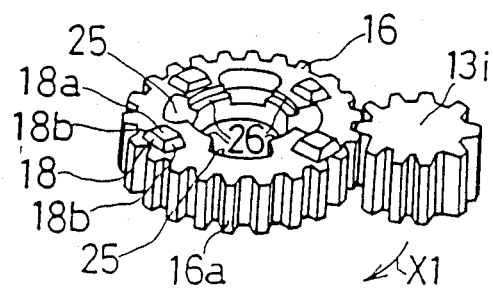
FIG. 7 is a partial perspective view of the major portion of the retractable mirror apparatus of the preferred embodiment according to this invention for illustrating the operations of the gear.

When storing the mirror by electrically rotating the mirror body 32, the motor 12 is turned on and actuated by operating a switch. The speed reducer gears 13a through 13i rotates while decelerating their speeds. When the speed reducer gears 13a through 13i rotate, the convex portion 9 of the control cam 10 disengages with the concave portion 2 of the control cam 3, but the engaging concave portions 23 of the claw clutch 20 and the engaged convex portions 18 of the gear 16 maintain the engagement therebetween. This is because the torque required for disengaging the engagement between the concave portion 2 of the control cam 3 and the convex portion 9 of the control cam 10 has been set less than the disengaging torque of the above-mentioned torque limiter mechanism. The gear 16 is accordingly fixed and kept in a rotation disabled state because the claw clutch 20 is fixed on the retraction shaft 5, which is placed in a fixed state, in a manner locking the rotation thereof. As shown in FIG. 7, the speed reducer gear 13i consequently rotates along the circumferential direction of the gear 16 in the direction of the arrow "X1" while meshing the teeth of the speed reducer gear 13i with the teeth 16a of the gear 16 placed in a fixed state. In other word, the speed reducer gear 13i revolves around the gear 16 while rotating around its own axis. As a result, the mirror frame 6 is rotated around the retraction shaft 5, and is stored in place.

When returning the mirror frame 6 from the storing position to the original operation position, the motor 12 is rotated in the opposite direction by operating the switch. Then, the speed reducer gear 13i revolves around the gear 16 kept in the non-rotation state in the direction opposite to the above-mentioned direction while rotating around its own axis in the direction opposite to the above-mentioned direction, because the gear 16 is fixed and kept in the non-rotation state by the claw clutch 20. The mirror frame 6 consequently rotates around the retraction shaft 5 in the direction opposite to the above-mentioned direction, and is set back in the original operation position.

Figure 5:
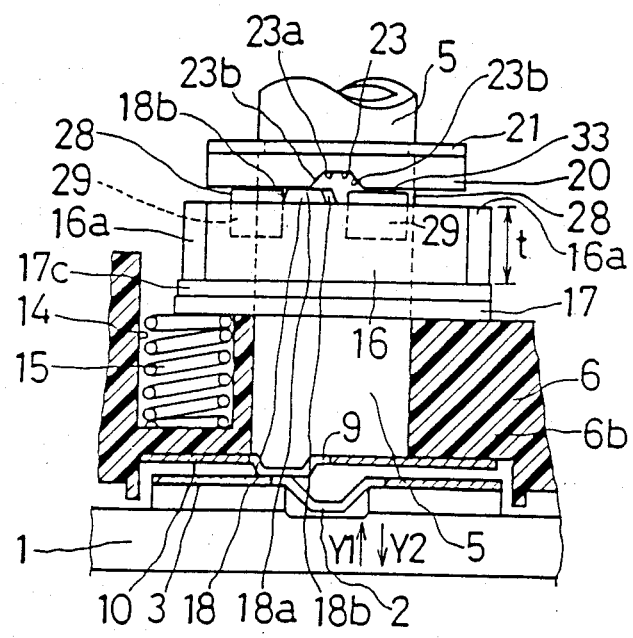
FIG. 5 is an enlarged cross-sectional view of the major portion of the retractable mirror apparatus of the preferred embodiment according to this invention, in which a claw clutch and a gear are disengaged.

Next, the rotation of the mirror frame 6 by the manual operation will be hereinafter described. In this operation, the mirror body 32 is gripped by a hand of an operator, and the mirror frame 6 is forcibly rotated around the retraction shaft 5. During the operation, the engagement relation between the gear 16 and the speed reducer gear 13i stays the same, because the switch is not operated and the motor 12 is not actuated. When the force manually applied to the mirror frame 6 is greater than the disengaging torque of the torque limiter mechanism, the inclining surfaces 18b of the engaged convex portions 18 of the gear 16 get over the inclining surfaces 23b of the engaging concave portions 23 of the claw clutch 20 as shown in FIG. 5. Namely, the gear 16 moves downward in the direction of the arrow "Y2" while compressing the compression springs 15 against the urging spring forces of the compression springs 15. The engagement between the engaging concave portions 23 of the claw clutch 20 and the engaged convex portions 18 of the gear 16 is disengaged accordingly. When the engagement therebetween is disengaged, the engagement between the convex portion 9 of the control cam 10 and the concave portion 2 of the control cam 3 is also disengaged accordingly. When the rotation of the mirror frame 6 by manual operation is further performed, the engaged convex portions 18 of the gear 16 engages the next engaging concave portions 23 of the claw clutch 20 one after another. When the engaged convex portions 18 and the engaging concave portions 23 engage, the bulk portions 29 of the cushioning member 28 contact with the claw clutch 20 while exerting elastic forces, namely the bulk portions 29 of the cushioning member 28 elastically contact with the claw clutch 20. As a result, the horizontal surfaces 18a of the engaged convex portions 18 do not contact with the horizontal surfaces 23a of the engaging concave portions 23 directly. Thus, unlike the conventional retractable mirror apparatus, no clicking noises, which sound like hitting a metal against the other metal, generate or the clicking noises hardly generate.

When the temperature is as low as in the cold season, the concave portion 2 of the control cam plate 3 and the convex portion 9 of the control cam plate 10 are sometimes frozen and stuck each other. In addition, when a foreign material gets into the retractable mirror apparatus, the control cam plate 3 and the control cam plate 10 are so stuck that they do not move relatively to each other. In these cases, when the switch is operated to actuate the motor 12 and the speed reducer gears 13a through 13i, the gear 16 tries to rotate around the speed reducer gear 13i in the circumferential direction thereof because the teeth of the speed reducer gear 13i and the teeth 16a of the gear 16 are meshing with each other. The inclining surfaces 18b of the engaged convex portions 18 of the gear 16 get over the inclining surfaces 23b of the engaging concave portions 23 of the claw clutch 20. Whereby the gear 16 moves downward in the direction of the arrow "Y2" while compressing the compression springs 15 against the urging spring forces of the compression springs 15, and the gear 16 rotates around the retraction shaft 5 while disengaging the engagement between the engaged convex portions 18 of the gear 16 and the engaging concave portions 23 of the claw clutch 20 one after another. However, note that the mirror frame 6 does not rotate in these cases. Thus, even when the freezing or the foreign material encroachment occurs, it is possible to prevent damages to the electric storing mechanisms of the retractable mirror apparatus resulting from the driving force of the motor 12 forcibly transmitted to the electric storing mechanisms thereof as least as possible. This is because the gear 16 absorbs the driving force of the motor 12 while rotating around the retraction shaft 5 in the above-mentioned manner. Similarly, in the above-mentioned cases, the bulk portions 29 of the cushioning member 28 also contact with the claw clutch 20 while exerting elastic forces, namely the bulk portions 29 of the cushioning member 28 also elastically contact with the claw clutch 20. As a result, the horizontal surfaces 18a of the engaged convex portions 18 do not contact with the horizontal surfaces 23a of the engaging concave portions 23 directly in the above-mentioned cases either. Thus, unlike the conventional retractable mirror apparatus, no clicking noises, which sound like hitting a metal against the other metal, generate or the clicking noises hardly generate.

By the way, it is necessary to make the face width "t" of the gear 16 in a dimension meeting the transmission of the retracting torque. In this respect, the face width "t" of the gear 16 also allows to form the housing concave portions 25 therein in the retractable mirror apparatus of this preferred embodiment. In other word, the bulk portions 29 of the cushioning member 28 are housed in the housing concave portions 25. Consequently, the mechanisms of the retractable mirror apparatus according to this preferred embodiment can be confined within the space occupied by the mechanisms of the conventional retractable mirror apparatus. The above-mentioned arrangement is thus advantageous for saving the space in the height direction.

Further, when the motor 12 is actuated in order to retract the mirror frame 6, vibrations resulting from the operations of the speed reducer gears 13a through 13i are transmitted to the retraction shaft 5. The retraction shaft 5 is consequently vibrated, and thereby operation noises might be caused. In this respect, the retractable mirror apparatus of this preferred embodiment is advantageous to relieve the vibrations of the retraction shaft 5, and the noise absorbing effect can be expected therefrom accordingly. This is because the bulk portions 29 and the arm portions 30 of the cushioning member 28 contacts with the outer circumferential surface 5e of the retraction shaft 5 while exerting elastic forces of themselves.

Furthermore, the cushioning member 28 of the retractable mirror apparatus of this preferred embodiment is advantageous to prevent the engaging concave portions 23 and the engaged convex portions 18 from being worn out or being roughed. This advantage results from the cushioning member 28 disposed between the claw clutch 20 and the gear 16. Whereby the clearance 31 can be formed between the claw clutch 20 and the gear 16 while maintaining the engagement between the engaging concave portions 23 of the claw clutch 20 and the engaged convex portions 18 of the gear 16.

In addition, in the retractable mirror apparatus of this preferred embodiment, the abrasion of the surfaces of the bulk portions 29 of the cushioning member 28 can be suppressed as least as possible when disengaging the engagement between the engaged convex portions 18 of the gear 16 and the engaging concave portions 23 of the claw clutch 20. This is because the clearance 33 is formed between the bulk portions 29 of the cushioning member 28 and the claw clutch 20 as shown in FIG. 5 during the disengagement. This arrangement is therefore advantageous to secure the durability of the cushioning member 28.

Moreover, in the retractable mirror apparatus of the above-mentioned preferred embodiment, the top surface of the bulk portions 29 of the cushioning member 28 is flat, but the arrangement is not limited thereto. Namely, a plurality of minute projections of a hemisphere shape, which contact with the claw clutch 20, may be formed on the top surface of the bulk portions 29.

The retractable mirror apparatus of the above-mentioned preferred embodiment is adapted to the automobile mirror apparatus, but is not limited thereto. The arrangements thereof may be adapted to an automobile fender mirror apparatus, an automotive inner rear view mirror apparatus and the like.

For special applications, at least one of the engaged convex portions 18 of the gear 16 and the engaging concave portions 23 of the claw clutch 20 may be formed of cushioning material such as rubber, resin and the like, and adapted to constitute a cushioning member.

Having now fully described the invention, it will be apparent to one of ordinary skill in the art that this invention is not limited only to the preferred embodiment described above and illustrated in the drawings. Accordingly, many changes and modifications can be made thereto without departing from the spirit or scope of the invention as set forth herein.

What is claimed is:

1. A retractable mirror apparatus comprising:
   a base;
   a retraction shaft held on said base;
   a mirror frame having a mirror mounting portion and engaged with said retraction shaft rotatably through a predetermined angle;
   a gear held rotatably on said retraction shaft and having at least one of engaged concave portions and engaged convex portions on an end surface thereof;
   a motor for rotating said mirror frame disposed in said mirror frame; and
   a claw clutch fixed on said retraction shaft and having at least one of engaging convex portions and engaging concave portions engageable and disengageable with said at least one of engaged concave portions and engaged convex portions of said gear in an area thereof facing said at least one of engaged concave portions and engaged convex portions of said gear, said concave and convex portions being formed of rigid material,
   wherein disengagement of said at least one of engaging convex portions and engaging concave portions of said claw clutch and said gear, respectively, permits relative rotation of said claw clutch and said gear, together with movement of said gear relative to said claw clutch in the direction of the length of said retraction shaft,
   wherein at least one of said gear and said claw clutch further comprises a cushioning member disposed in such a manner as to be elastically contactable with the other one of said gear and said claw clutch only when said at least one of said engaging convex portions and engaging concave portions of said claw clutch and said gear engage one another, whereby said cushioning member damps vibrations resulting from the engagement of said engaging convex and concave portions.

2. A retractable mirror apparatus according to claim 1, wherein said cushioning member is disposed so that a clearance is formed between said gear and said claw clutch when said gear and said claw clutch engage with each other.

3. A retractable mirror apparatus according to claim 2, wherein the inner circumferential surface of said cushioning member comes in contact with the outer circumferential surface of said retraction shaft, thereby relieving the vibrations of said retraction shaft and absorbing operation noises.

4. A retractable mirror apparatus according to claim 1, wherein said gear comprises said cushioning member, and a clearance is formed between the top surface of said cushioning member and the lower surface of said claw clutch when said gear disengages with said claw clutch.

5. A retractable mirror apparatus according to claim 1, wherein part of said cushioning member is housed at least in one of said gear and said claw clutch.

6. A retractable mirror apparatus comprising:
   a mirror stay;

a retraction shaft held on said mirror stay in an upright manner;

a mirror frame having a mirror mounting portion and engaged with said retraction shaft rotatably through a predetermined angle;

a pair of control cam plates held on said mirror stay in a manner locking the rotations thereof and formed engageable and disengageable with each other;

a plurality of compression springs housed in the lower portion of said mirror frame around said retraction shaft;

a gear held rotatably on said retraction shaft, having engaged convex portions on the top end surface thereof and urged by said compression springs in the upward direction;

a claw clutch fixed on said retraction shaft at a position over said gear in a manner locking the rotation thereof and having engaging concave portions engageable and disengageable with said engaged convex portions of said gear on the bottom end surface thereof, said concave and convex portions being formed of rigid material.

wherein disengagement of said at least one of engaging convex portions and engaging concave portions of said claw clutch and said gear, respectively, permits relative rotation of said claw clutch and said gear, together with movement of said gear relative to said claw clutch in the direction of the length of said retraction shaft;

a motor for rotating said mirror frame disposed in said mirror frame; and a speed reducer gear mechanism connected to said motor and said gear, wherein said gear further comprises a cushioning member disposed in such a manner as to be elastically contactable with said claw clutch only when said at least one of said engaging convex portions and engaging concave portions of said claw clutch and said gear engage one another, whereby said cushioning member damps vibrations resulting from the engagement of said engaging convex and concave portions.

7. A retractable mirror apparatus according to claim 6, wherein said cushioning member is disposed so that a clearance is formed between said gear and said claw clutch when said gear and said claw clutch engage with each other.

8. A retractable mirror apparatus according to claim 7, wherein the inner circumferential surface of said cushioning member comes in contact with the outer circumferential surface of said retraction shaft, thereby relieving the vibrations of said retraction shaft and absorbing operation noises.

9. A retractable mirror apparatus according to claim 6, wherein a clearance is formed between the top surface of said cushioning member and the lower end surface of said claw clutch when said gear disengages with said claw clutch.

10. A retractable mirror apparatus according to claim 6, wherein part of said cushioning member is housed in said gear.

11. A retractable mirror apparatus according to claim 6, wherein said cushioning member comprises a plurality of bulk portions and a plurality of arm portions connecting neighboring bulk portions.

12. A retractable mirror apparatus according to claim 6, wherein the torque required for disengaging the engagement between said claw clutch and said gear is set greater than the torque required for disengaging the engagement between said pair of control cam plates.

* * * * *